June 14, 1949.                R. P. CLIFTON                2,473,137
                   SHROUD FOR MULTIPLE RUNNER FLUID COUPLINGS
Filed Dec. 12, 1945                                   2 Sheets-Sheet 1

INVENTOR
ROBERT P. CLIFTON
BY
ATTORNEY

June 14, 1949.  R. P. CLIFTON  2,473,137
SHROUD FOR MULTIPLE RUNNER FLUID COUPLINGS
Filed Dec. 12, 1945  2 Sheets-Sheet 2
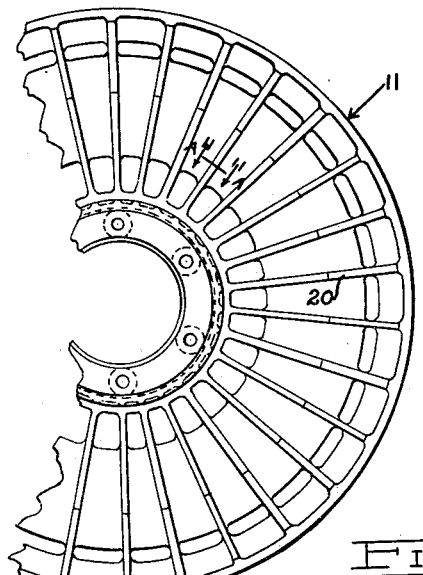
FIG. 4
FIG. 4A
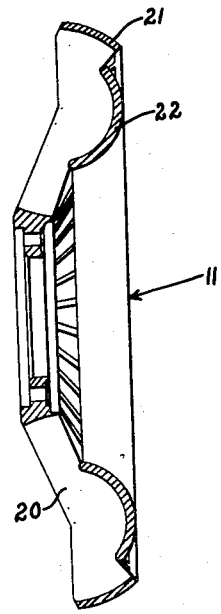
FIG. 5
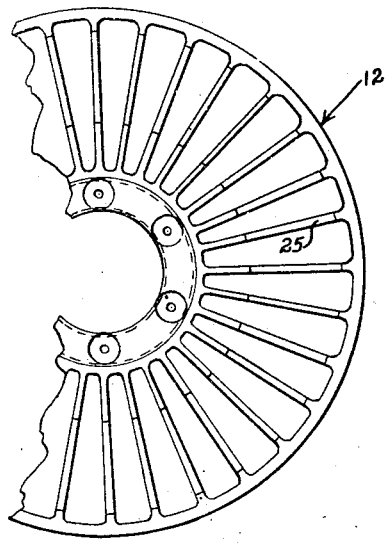
FIG. 6
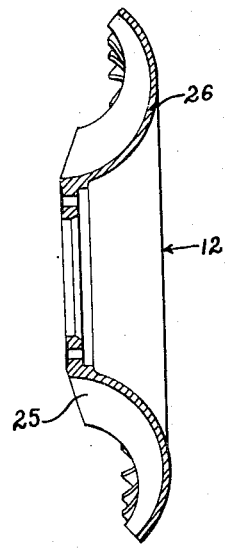
FIG. 7
INVENTOR
ROBERT P. CLIFTON
BY Maxwell K. Murphy
ATTORNEY Patented June 14, 1949

2,473,137

UNITED STATES PATENT OFFICE 2,473,137

SHROUD FOR MULTIPLE RUNNER FLUID COUPLINGS

Robert P. Clifton, Dearborn, Mich., assignor to Packard Motor Car Company, Detroit, Mich., a corporation of Michigan Application December 12, 1945, Serial No. 634,418

7 Claims. (Cl. 60—54)

1

This invention relates to variable speed power transmission mechanism and particularly to transmissions for motor vehicles.

During recent years fluid couplings have become increasingly popular in automotive drives. When these devices are used with a conventional change-speed transmission or with an automatically shiftable gearbox, the slipping characteristic thereof permits the driver to stop without disengaging the clutch and to remain in the higher gear ratios for practically all ordinary driving.

Because the well known two element coupling can not multiply torque, it must be used with some sort of change-speed gearbox. Attempts to utilize the slipping characteristic of the coupling to affect an automatic gear change by providing two driven elements, one connected to the output shaft through a gearset and the other connected to the output shaft directly or through a higher ratio gearset have been somewhat successful. See for example that patent to Duffield, No. 2,373,234, granted April 10, 1945.

In transmissions such as shown by Duffield, the impeller of the fluid coupling is rotated at engine speed, and a pair of runners disposed in series with the impeller and with each other are connected respectively to the propeller shaft through gearsets of different ratio. The vehicle is started from rest in the lowest gear ratio, the first runner transmitting the torque and when the torque difference between the propeller shaft and the engine shaft decreases by a predetermined amount, the second runner assumes the drive in a higher ratio, a one-way clutch being provided to permit overrun of the gearsets.

A disadvantage of such an arrangement lies in the comparatively short period of operation in the lower gear ratio. When driving a vehicle so equipped, one is aware of a "flat spot" in the acceleration run which occurs almost immediately after breakaway from rest. This is caused by the second runner of the coupling taking over the drive too soon and before sufficient momentum of the vehicle has been attained.

The object of my invention is to provide an improved fluid coupling wherein the runners are constructed and arranged such that a plurality of circulating fluid circuits are set up whereby the distribution of torque between the runners may be more accurately predetermined.

More specifically, I provide an improved design of coupling wherein the period of slip between the runners is substantially lengthened during acceleration of the vehicle when the coupling is used with a gearbox as described above.

2

In describing my invention, I have omitted the gearing, engine, disconnecting clutch, etc., as these parts form no part thereof. In the drawings:

Fig. 4 is a front elevation (partly broken away) of the primary runner of the Fig. 1 coupling;

Fig. 4a is a sectional detail of Fig. 4, as indicated by A—A thereon;

Fig. 5 is a vertical section of the Fig. 4 runner; and

Figs. 6 and 7 are views similar to Figs. 4 and 5, but of the secondary runner of the coupling of Fig. 1.

Figure 1:
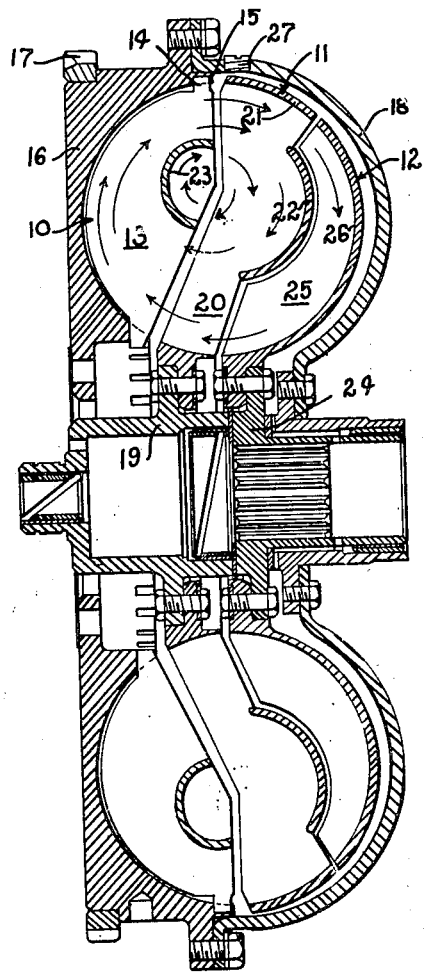
Fig. 1 is a vertical longitudinal sectional view of one form of my improved coupling.

Referring to Figs. 1 and 4 to 7, it will be seen that my improved fluid coupling comprises an impeller 10, a primary runner 11 and a secondary runner 12. The primary runner 11 is disposed between the impeller 10 and the secondary runner 12 and the runners are enclosed in a fluid tight casing. The impeller has vanes 13 arranged radially about the axis of the coupling. These vanes are preferably formed by die casting as a single sub-assembly, a torus member 23 being cast integral therewith, and are provided with tabs 14 which are received in slots 15 formed in the housing member 16. The tabs 14 are securely fastened to the member 16 by staking or peening. The housing 16 is adapted to be fastened to the engine crankshaft (not shown) and carries a gear 17 which may be engaged by the starter pinion for starting the engine.

A housing member 18 is detachably secured to the member 16 and when assembled with the engine, the housing is made fluid tight. The member 16 is of relatively heavy section and together with housing 18 constitutes the engine flywheel.

Mounted in coaxial relation with the housing is a hub 19 which carries the primary runner 11. The latter is preferably formed as an integral die casting (Figs. 4 and 5) of light metal to insure a small polar moment of inertia and is bolted to the hub 19 or otherwise attached in any suitable manner.

The runner 11 has radial vanes 20, an outer shroud 21 and an inner shroud 22. The inner shroud 22 is disposed approximately opposite the torus or shroud 23 carried by the impeller such that an inner zone of fluid circulation is provided as will be later explained.

Mounted coaxially with the hub 19 is another hub 24 to which the secondary runner 12 is secured. The latter is also preferably formed of a single die casting of light metal (see Figs. 6 and 7) and has radial vanes 25 and an outer shroud 26.

The primary runner 11 is cut away around the shroud 22 in such manner that it is adapted to nest with the secondary runner 12 as can be seen in the drawing. It will be seen also that the form of the respective runners 11 and 12 is such that they are perfectly adapted to die casting technique.

As indicated in Fig. 4a, the vanes 20 of runner 11 have a slight taper or draft (in the order of 1°) for easy withdrawal of the article from the mold. In addition, the outer shroud 21 and the inner shroud 22 are disposed in non-overlapping relation and the arcs of these members have been chosen so that natural draft is provided and no interference to removal from the mold is provided.

The vanes 25 of the runner 12 are similarly tapered and the shroud 26 extends radially outwardly from the hub, the arc thereof being considerably less than 180°. Here again no interference with the mold is encountered in casting.

It will be understood that the hubs 19 and 24 are adapted to be connected by means of suitable shafts with gearsets of different ratio in a manner suggested by the aforesaid Duffield patent. The coupling is filled with fluid by moving fluid to the coupling through passages formed in or between the runner shafts with a fluid reservoir for continuous replenishment of the fluid supply if desired. The plug 27 provides means for draining the coupling of fluid.

The operation of the device is as follows:

Let it be assumed that the impeller is rotated by an engine and that the two runners are connected with the vehicle driving wheels through gearsets of different ratio.

Immediately upon rotation of the impeller 10, fluid is set in motion by centrifugal force and travels radially outwardly in the passages formed by the vanes 13 as indicated by the arrows. The shroud 23 directs the fluid into the passages of the primary runner 11 and part of the flow travels through the primary runner passages into the passages of the secondary runner 12, while another part of the flow directed by the shroud 22, travels radially inwardly and back into the impeller passages directly. The fluid that enters the secondary runner 12 is returned to the impeller by way of the primary runner passages at the radially innermost portions thereof.

In addition, a portion of the fluid circulates about the center of the vortex and inside the confines of both shrouds 22 and 23. The arrows on Fig. 1 clearly indicate the three distinct toroidal paths of fluid circulation, viz.: A, from the impeller to the primary runner, to the secondary runner, thence back to the impeller through the primary runner this being radially outside of both shrouds 22 and 23: B, from the impeller to the primary runner and back to the impeller; this circuit being outside of shroud 23 and inside of shroud 22. C, from the impeller to the primary runner and back to the impeller inside of both shroud 22 and shroud 23.

It may readily be seen that the energy imparted to the fluid during its radial acceleration in the impeller passages of the respective runners in proportion to the slip and to the radial runner vane area that is subjected to the force of the fluid. In the case of the form of the invention shown in Fig. 1, the fluid will exert more force on the primary runner 11 than on the secondary runner 12 at the start of rotation of the runners. As the slip of the primary runner 11 with respect to the impeller 10 decreases due to acceleration of the vehicle with consequent lessening of load resistance, the energy taken from the fluid by the runner 11 decreases and the runner 12 receives more and more energy which tends to increase its speed and decrease the slip.

The secondary runner 12 eventually will approach the speed of the runner 11 and will assume the drive if connected to a higher ratio gearset, the runner 11 either free-wheeling in the circuit or locking up to the runner 12 by means of an automatic clutching device (no shown). At the end of the acceleration period, slip will practically disappear and all three fluid elements will rotate at substantially equal speed.

It may thus be seen that I have provided in a multiple runner coupling an arrangement of the coupling elements which permits a relatively longer period of slip between the runners with consequent improved acceleration of the load.

Figure 2:
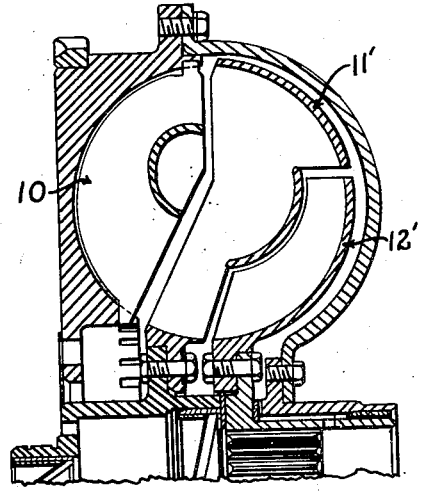
Figs. 2 and 3 are similar part-sectional views of modified forms of the invention.

Fig. 2 shows a modified form of coupling wherein the primary runner 11' provides a relatively greater vane area exposed to the fluid circuit during its radially inward travel and the secondary runner 12' has a relatively smaller vane area thus exposed. This form of coupling provides a longer intermediate speed ratio acceleration period than that of Fig. 1 because of the longer period of slip between the runners.

Figure 3:
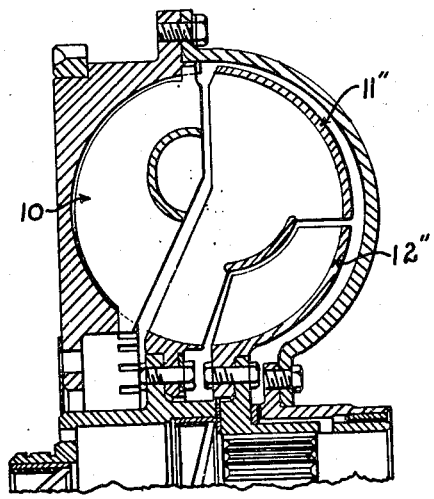

Fig. 3 shows still another modification, the vane areas of the two runners having been modified to provide a still longer acceleration period.

Which of the couplings illustrated in Figs. 1-3 is best for a particular vehicle depends upon several factors such as the power-weight ratio, the desired acceleration characteristics, the gear ratios, etc.

The relationship between certain of the circuits established in the foregoing coupling is described and claimed in my prior application, Serial No. 588,617, filed April 16, 1945.

Having thus described for illustrative purposes preferred forms of my invention, I wish to point out that I do not intend to limit the invention in its broader aspects except as set forth in the claims below.

I claim:

1. A fluid coupling having an impeller, a primary runner and a secondary runner, a shroud carried by the impeller; shrouds carried by the runners, said shrouds being disposed in cooperative relation such that upon rotation of the impeller a plurality of fluid circulating circuits are provided, one of said circuits disposed radially outside said impeller shroud and including only the impeller and the primary runner.

2. A fluid coupling having an impeller, a primary runner and a secondary runner, a shroud carried by the impeller; shrouds carried by the runners, said shrouds being disposed in cooperative relation such that upon rotation of the impeller a plurality of fluid circulating circuits are provided, one of said circuits disposed radially outside said impeller shroud and including only the impeller and the primary runner, and another of said circuits disposed radially inside said impeller shroud and including only the impeller and the primary runner.

3. A fluid coupling having an impeller, a primary runner and a secondary runner, a shroud carried by the impeller; shrouds carried by the runners, said shrouds being disposed in cooperative relation such that upon rotation of the impeller a plurality of fluid circulating circuits are provided, one of said circuits disposed radially outside said impeller shroud and including only the impeller and the primary runner, another of said circuits disposed radially inside said impeller shroud and including only the impeller and the primary runner, and a third circuit disposed radially outside said impeller shroud and including the impeller and both runners.

4. A fluid coupling having an impeller, a primary runner and a secondary runner; an inner shroud on the impeller for defining the vortex of the fluid circuit; an inner shroud on the primary runner arranged to cooperate with said impeller shroud such that upon rotation of the impeller a plurality of fluid circuits are provided, one within said shrouds, another outside said shrouds and a third outside of said impeller shroud but within said runner shroud.

5. A fluid coupling including an impeller member and a pair of runner members arranged for rotation relatively to the impeller and each other, means for circulating fluid from said impeller member through said runner members and back to said impeller member, said runner members being disposed in nested relation, and means comprising shrouds on said impeller and runner members for dividing the fluid flow into a plurality of circuits, two of said circuits including one only of said runner members.

6. A runner for a fluid coupling, said runner comprising a hub, a plurality of vanes extending radially outward from said hub, and fluid directing shrouds extending across the vanes, each shroud defining a portion of different sized toroidal fluid circuits through the coupling and neither shroud overlapping the other in a radial direction.

7. A runner for a fluid coupling, said runner comprising a hub, a plurality of vanes extending radially outward from said hub and including portions of inner and outer toroidal fluid circuits through the coupling, shrouds extending across the ends of the vanes and defining the outer boundary of the outer toroidal fluid circuit, and a second shroud extending across the sides of the vanes and defining the outer boundary of the inner toroidal circuit, neither shroud overlapping the other in a radial direction.

ROBERT P. CLIFTON.

REFERENCES CITED

The following references are of record in the file of this patent:

UNITED STATES PATENTS

| Number | Name | Date |
|---|---|---|
| 1,197,755 | Möller | Sept. 12, 1916 |
| 1,904,054 | Kiep et al. | Apr. 18, 1933 |
| 2,084,312 | Astafiev | June 22, 1937 |
| 2,212,901 | Schneider | Aug. 27, 1940 |
| 2,238,748 | Patterson | Apr. 15, 1941 |
| 2,318,660 | Barrett | May 11, 1943 |
| 2,360,259 | Murray | Oct. 10, 1944 |

FOREIGN PATENTS

| Number | Country | Date |
|---|---|---|
| 376,268 | Great Britain | July 4, 1932 |
| 548,044 | Great Britain | Sept. 23, 1942 |